United States Patent [19]
Tamaru et al.

[11] Patent Number: 5,225,131
[45] Date of Patent: Jul. 6, 1993

[54] PROCESS FOR PRODUCING MULTILAYER POLYTETRAFLUOROETHYLENE POROUS MEMBRANE AND SEMISINTERED POLYTETRAFLUOROETHYLENE MULTILAYER STRUCTURE

[75] Inventors: Shinji Tamaru; Katsutoshi Yamamoto; Osamu Tanaka; Hirofumi Nishibayashi, all of Osaka; Osamu Inoue, Kyoto, all of Japan

[73] Assignee: Daikin Industries, Ltd., Osaka, Japan

[21] Appl. No.: 895,156

[22] Filed: Jun. 5, 1992

Related U.S. Application Data

[62] Division of Ser. No. 622,984, Dec. 6, 1990, abandoned.

[30] Foreign Application Priority Data

Dec. 7, 1989 [JP] Japan .................................. 1-320274
Mar. 8, 1990 [JP] Japan .................................. 2-57759

[51] Int. Cl.⁵ ........................... B29C 47/06; B32B 5/26
[52] U.S. Cl. .................................. 264/113; 264/119; 264/122; 264/127; 264/288.8
[58] Field of Search ............... 264/113, 119, 122, 127, 264/288.8

[56] References Cited

U.S. PATENT DOCUMENTS 4,576,861  3/1986  Kato ........................... 428/423 X
5,064,593  11/1991  Tamaru et al. ..................... 264/113

FOREIGN PATENT DOCUMENTS 0051957  5/1982  European Pat. Off. .
0087149  8/1983  European Pat. Off. .
2142784  2/1973  France .
8805687  8/1988  PCT Int'l Appl. .

OTHER PUBLICATIONS

WO88/05687, WIPO, Aug. 1988.

Primary Examiner—Mary Lynn Theisen
Attorney, Agent, or Firm—Sughrue, Mion, Zinn, Macpeak & Seas

[57] ABSTRACT

A process for producing a multilayer polytetrafluoroethylene porous membrane is disclosed, which process comprises at least two layers having different average pore diameters, the process comprising the steps of: filling the inside of a cylinder of an extruding mold distinctively with at least two kinds of polytetrafluoroethylene fine powders with each of which a liquid lubricant has been mixed; paste-extruding the powders to obtain a multilayer extrudate, which is then optionally rolled; removing the liquid lubricant from the multilayer extrudate or the rolled multilayer extrudate to obtain an unsintered multilayer structure; subsequently heating the unsintered multilayer structure at a temperature not lower than the melting point of sintered polytetrafluoroethylene to obtain a semisintered multilayer structure; and then stretching the semisintered multilayer structure at least monoaxially. A semisintered polytetrafluoroethylene multilayer structure capable of being used as an intermediate material for the above process is also disclosed.

4 Claims, 10 Drawing Sheets

PROCESS FOR PRODUCING MULTILAYER POLYTETRAFLUOROETHYLENE POROUS MEMBRANE AND SEMISINTERED POLYTETRAFLUOROETHYLENE MULTILAYER STRUCTURE

This is a Divisional of Application No. 07/622,984, filed Dec. 6, 1990, now abandoned.

FIELD OF THE INVENTION

The present invention relates to a process for producing a multilayer polytetrafluoroethylene (hereinafter referred to as "PTFE") porous membrane. More particularly, it relates to a process for producing a multilayer PTFE porous membrane in which all the layers have been united tightly and which comprises at least two layers having different average pore diameters. The present invention also relates to a semisintered PTFE multilayer structure capable of being used as an intermediate material for the production of the multilayer PTFE porous membrane.

BACKGROUND OF THE INVENTION

PTFE is plastics having excellent heat and chemical resistance, and porous membranes made of PTFE are extensively utilized as filter media for corrosive gases and liquids, permeable membranes for electrolysis, and battery separators. Their use as a filter medium in the precision filtration of various gases and liquids used in the semiconductor industry has become an extremely important application thereof.

In order that a porous membrane be an excellent filter medium, the pore diameter distribution of the membrane should be sharp and, when a fluid is allowed to permeate through the membrane pores at a certain pressure, the amount of the fluid passing through the membrane per unit time should be large. It has conventionally been known that the smaller the membrane thickness, the higher the permeation rate for a fluid, when porosity and pore diameter are constant. However, porous membranes having smaller membrane thicknesses may suffer deformation due to pressure exerted thereon during filtration and, as a result, the pore diameters are changed or, in some cases, the membranes are broken to be unable to function as a filter medium. In addition, the handling properties of such thin porous membranes are so poor that they are apt to be damaged when processed into filter modules or fixed to filter holders.

For the purpose of eliminating these problems, several multilayer PTFE porous membranes have been proposed which comprise a filter layer having small pore diameters and a support layer having larger pore diameters than the filter layer. Conventional processes for producing such membranes include, for example, (1) a process in which one or more PTFE porous structures having smaller pore diameters and one or more PTFE porous structures having larger pore diameters are superposed on each other in an unsintered state and then press-bonded, and the resulting film is sintered at a temperature not lower than the melting point of PTFE to obtain a multilayer PTFE porous membrane (as described in JP-A-54-97686), and (2) a process in which an unsintered film is stretched between a roll revolving at a low speed and a roll revolving at a high speed, while a temperature gradient is being created in the direction of the thickness of the thin film and, at the same time, a compressive force is being applied in that direction, thereby to obtain a porous membrane in which its obverse side and reverse side have different pore diameters (as described in JP-B-63-48562). (The term "JP-A" and "JP-B" as used herein mean an "unexamined published Japanese patent application" and an "examined Japanese patent publication", respectively.)

Further, although intended for producing a filter medium not for precision filtration but for the separation and enrichment of mixed isotopic gases, a conventional method for manufacturing a microporous permeable membrane include (3) a process in which one or more PTFE thin films in which a liquid pore-forming agent has been incorporated and one or more other PTFE thin films in which a liquid pore-forming agent has been incorporated are superposed on each other, the resulting assemblage is rolled to bond the thin films with each other, and then the liquid pore-forming agents are extracted with a low molecular weight liquid to form pores, thereby obtaining a multilayer PTFE porous membrane comprising at least two layers having different average pore diameters (as described in JP-B-55-22504).

In process (1) above, sintering of unsintered stretched superposed films at a temperature not lower than the melting point of the PTFE powders gives a fusion-bonded united film, as disclosed in JP-A-51-30277. When unsintered sheets or films made from PTFE fine powders are lapped and then sintered, the respective layers are fusion-bonded with each other to give a united shape, and this technique has conventionally been known as, for example, a manufacturing method for PTFE-lapped electrical cables and PTFE-lapped tubes or pipes. Therefore, the method of superposing stretched porous structures with different pore diameters on each other and sintering the assemblage at a temperature not lower than the melting point of the PTFE has been quite common in the art. Process (1) above is disadvantageous in that it necessitates a step of separately forming two or more sheets or films having different porosities and the subsequent sintering step, which should be performed while the sheets or films superposed on each other are being pressed together. Furthermore, in order to industrially produce films with extremely small thicknesses or low strengths by such a laminating technique, expensive facilities and a high degree of skill are required so as to avoid occurrence of wrinkling, breakage, etc. in the process.

Process (2) above is disadvantageous in that the stretching, which is conducted between rolls, is limited to monoaxial stretching and biaxial stretching cannot be used in this method.

Process (3) above is characterized in that a membrane comprising two or more layers having different average pore diameters is obtained not through stretching, but by varying the packing densities of emulsion-polymerized PTFE powders having different primary particle sizes and shapes and also by use of pore-forming agents of different kinds. However, it should be noted that the pores in this membrane are mere spaces among emulsion-polymerized PTFE particles, that is, the unsintered film obtained from emulsion-polymerized PTFE by a paste-processing technique has a structure which nearly is the closest packing of the PTFE primary particles. Illustratively state, the primary particles have specific gravities of from 2.1 to 2.3 and the processed film has a bulk specific gravity of from 1.5 to 1.6 in the case where an ordinary petroleum solvent or the like has been used for shaping the film, and the difference between the specific gravities is ascribable to pores, which are spaces among the polymer particles. Such a membrane has a poor filter performance, i.e., very poor fluid permeability, and also has a very low strength compared with sintered membranes. If the unsintered multilayer membrane is sintered in order to increase its strength, it becomes non-porous to be unusable as a filter medium for fluids in the semiconductor industry.

It has been proposed to obtain a multilayer porous membrane by a method in which rolled PTFE sheets containing a lubricant are superposed on each other, and the resulting assemblage is further rolled to a smaller thickness and then stretched (as described in JP-A-57-131236). The porous membrane obtained by this process, however, consists of layers that do not differ in porosity from each other at all, although it has high inter-layer bonding strength. JP-B-56-17216 discloses a process for producing a single-layer PTFE porous membrane having a high tensile strength. Conventionally, the size of small pores has been controlled by stretching and amorphous-lock, especially by changing the temperature, the drawing rate per unit time, and the draw ratio.

On the other hand, unsymmetrical membranes consisting of an extremely thin filter layer and a support layer which is thicker and has larger pore diameters than the filter layer are manufactured from cellulose acetate or polysulfone. However, since such unsymmetrical membranes are obtained by wet coagulation processes, the membrane material is required to be soluble in the solvent used and, hence, this method has not been applicable to PTFE, which is not soluble in any ordinary solvent at all.

SUMMARY OF THE INVENTION

The present inventors have conducted intensive studies in order to eliminate the above-described problems of the conventional techniques. As a result, a method has been developed for producing a multilayer PTFE porous membrane which comprises a filter layer having a small average pore diameter and a support layer having a larger average pore diameter than the filter layer, and in which all the layers have been bonded to the adjacent layer(s) completely throughout the interface(s). By this method, an extremely thin filter layer can be formed.

That is, the present inventors have surprisingly found that by stretching a multilayer structure consisting of layers of two or more kinds of PTFE fine powders having different average molecular weights, a multilayer porous membrane can be obtained easily in which the layers have different pore diameters despite the same stretching conditions and which is free of interlaminar peeling.

Accordingly, an object of the present invention is to provide a process for producing a multilayer PTFE porous membrane free from the above-described prior art problems and having excellent permeability to various kinds of gases and liquids.

Another object of the present invention is to provide a semisintered PTFE multilayer structure which is useful as an intermediate material for the production of the multilayer PTFE porous membrane described above, and which has so good stretchability that a uniform pore diameter distribution is obtained even through stretching thereof in a very high draw ratio.

Other objects and effects of the present invention will be apparent from the following description.

The present invention provides a process for producing a multilayer polytetrafluoroethylene porous membrane, which process comprises at least two layers having different average pore diameters, the process comprising the steps of: filling the inside of a cylinder of an extruding mold distinctively with at least two kinds of polytetrafluoroethylene fine powders with each of which a liquid lubricant has been mixed; paste-extruding the powders to obtain a multilayer extrudate, which is then optionally rolled; removing the liquid lubricant from the multilayer extrudate or the rolled multilayer extrudate to obtain an unsintered multilayer structure; subsequently heating the unsintered multilayer structure at a temperature not lower than the melting point of sintered polytetrafluoroethylene to obtain a semisintered multilayer structure; and then stretching the semisintered multilayer structure at least monoaxially.

The present invention also provides a semisintered polytetrafluoroethylene multilayer structure capable of being used as an intermediate for the above process, which multilayer structure is produced by heating an unsintered multilayer structure comprising at least two polytetrafluoroethylene layers at a temperature not lower than the melting point of sintered polytetrafluoroethylene, each of the polytetrafluoroethylene layers constituting said semisintered multilayer structure having a distinct endothermic peak on a crystalline melting curve in a temperature of from 332° to 348° C. as measured with a differential scanning calorimeter and has a crystalline conversion of from 0.10 to 0.85.

DETAILED DESCRIPTION OF THE INVENTION

The process of the present invention for producing a multilayer PTFE porous membrane comprises the following steps.

(1) Paste-Extrusion Step

This step may be performed according to the paste-extrusion method conventionally known as a technique for manufacturing PTFE unsintered articles. However, this step is characterized in that prior to extrusion, a multilayer preform 7 is obtained, for example, in a manner such as that illustrated in FIG. 1. As FIG. 1 (e) shows, this multilayer preform 7, for example, consists of a first layer 4, a second layer 5, and a third layer 6 made of three PTFE fine powders 1, 2, 3, respectively (the figure shows an example of a preform of a three-layer flat structure, but the preform prepared in the present invention is not limited thereto). Each of the layers 4 to 6 is formed from a wetted powder obtained by adding a liquid lubricant, such as solvent naphtha or white oil, to a fine powder prepared by the coagulation of an aqueous dispersion of emulsion-polymerized PTFE having an average primary particle diameter of from 0.2 to 0.4 $\mu$m. The amount of the liquid lubricant to be used is varied depending on its kind, forming conditions, etc. Generally, however, the liquid lubricant is used in an amount of from 20 to 35 parts by weight per 100 parts by weight of the fine powder. A colorant or the like may further be added to the fine powder. The preform 7 is prepared as follows. First, as shown in FIG. 1 (a), a PTFE fine powder 1 for obtaining a first layer 4 is placed in a box-shaped mold 8 in such a manner that the powder 1 is spread over a bottom force 9 to form a layer of the powder 1. Subsequently, as shown in FIG. 1 (b), a top force 10 is pressed against the powder in the direction indicated by arrow 11. Thus, the powder is compressed to form the first layer 4.

The top force 10 is then removed, and a PTFE fine powder 2 for forming a second layer 5 is placed in the mold 8 as shown in FIG. 1 (c). This powder 2 is compressed with the top force 10 in the same manner as in FIG. 1 (b) described above, to form the second layer 5 on the first layer 4 as shown in FIG. 1 (d). Thereafter, a PTFE fine powder 3 for forming a third layer 6 is placed in the mold 8 as shown in FIG. 1 (d) and then compressed with the top force 10.

Figure 1A:
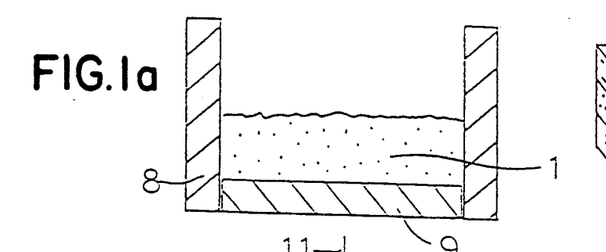
FIG. 1 diagrammatically illustrates steps for producing a multilayer preform according to one embodiment of the process of the present invention.
Figure 1B:
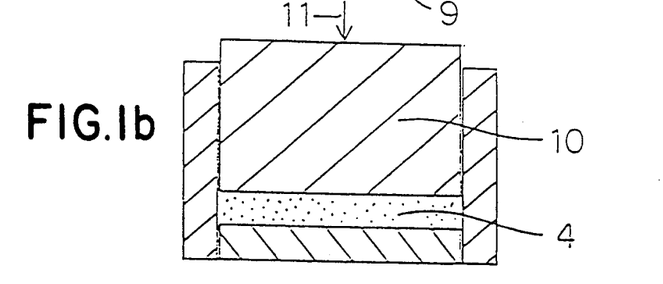
Figure 1C:
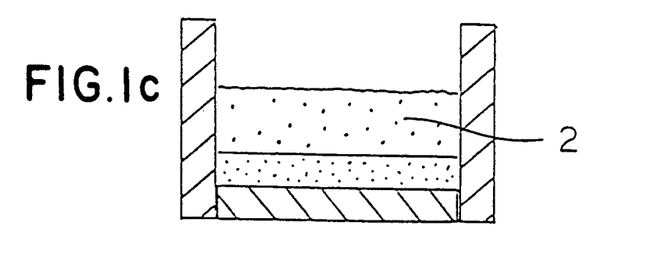
Figure 1D:
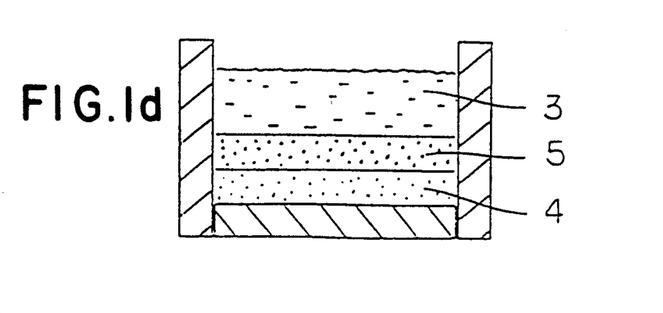
Figure 1E:
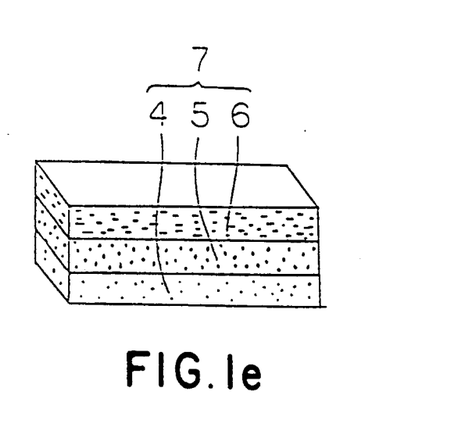
Figure 2:
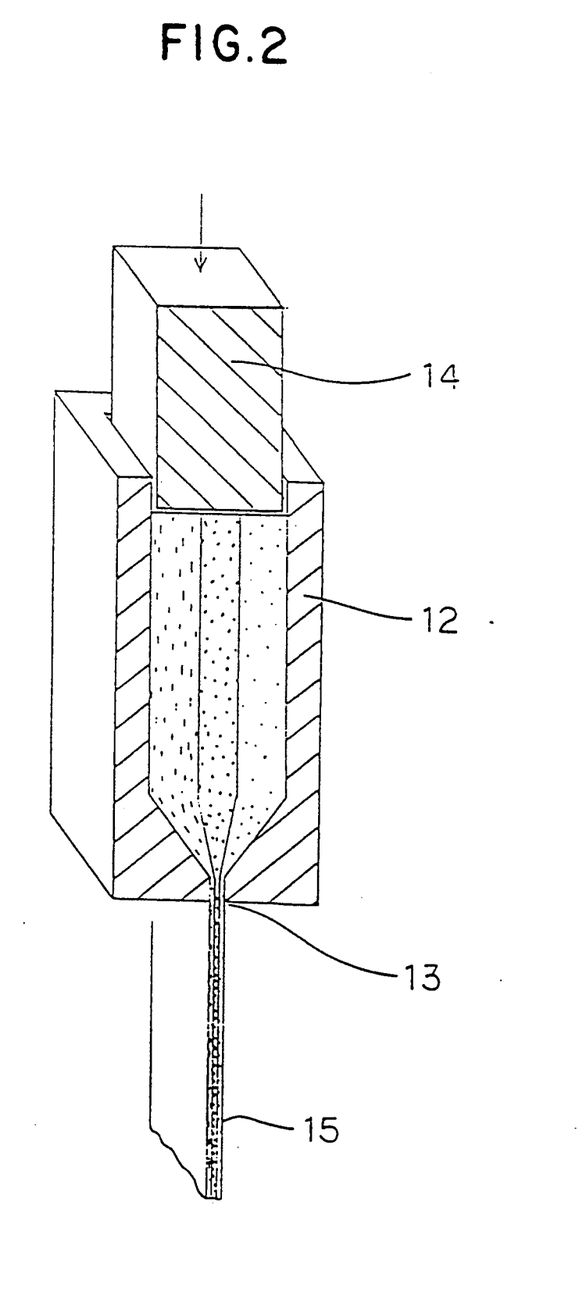
FIG. 2 is a sectional view illustrating the state of paste extrusion being performed according to one embodiment of the process of the present invention.

Thus, the multilayer preform 7 is finally obtained which comprises the first layer 4, the second layer 5, and the third layer 6 as shown in FIG. 1 (e), and which has been shaped so as to fit almost tightly into the inside of the cylinder 12 of a paste-extruding mold shown in FIG. 2.

This preform 7 is put in the cylinder 12 of a paste-extrusion apparatus shown in FIG. 2, and then pushed with a ram 14. This cylinder 12 of the mold shown in FIG. 2, for example, has a rectangular section measuring 50 mm × 100 mm, in the direction perpendicular to the axis, and narrows at one end thereof at an outlet part 13 of the mold to form a nozzle having an orifice measuring 50 mm × 5 mm.

By pushing the preform 7 through the nozzle orifice, the first layer 4, the second layer 5, and the third layer 6 are completely united to form a paste-extruded sheet 15 in which each layer has a uniform thickness. It was ascertained by a stereomicroscopic examination that the relative thickness of each of the layers constituting this paste-extruded sheet 15 was the same as that for the multilayer preform used. As described above, by forming the preform 7 beforehand, it has become possible to easily produce even a laminate having a very thin and low-strength layer; production of such a laminate has been difficult with the conventional techniques.

(2) Rolling Step

In this step, which may be performed if required and necessary, the paste-extruded sheet may be rolled according to an ordinary rolling method as follows.

The sheet obtained in paste-extrusion step (1) is cut into a proper length. The cut sheet is rolled by means of pressure rolls in a direction along or across the extruding direction, thereby to obtain a multilayer film having a thickness of, for example, 100 $\mu$m.

Thereafter, the liquid lubricant is removed from the multilayer film. The removal of the liquid lubricant can be conducted by extraction and/or drying (for example, heat-drying in an oven at 250° C. for 20 seconds). Thus, an unsintered PTFE multilayer structure is obtained.

In the above-described paste-extrusion step (1) and rolling step (2) if any, the PTFE preform receives shearing force to partly change into fibers. Due to the fiber formation, the paste-extruded sheet or the rolled film can have a moderate strength and elongation.

All procedures in the above two steps are performed at temperatures not higher than about 327° C., which is the melting point of sintered PTFE, and in general, performed at around room temperature.

(3) Heat Treatment Step

In this step, the unsintered multilayer structure obtained through the above-described paste-extrusion step (1) and rolling step (2) if any is heated at a temperature not lower than the melting point of sintered PTFE. By one embodiment of this heat treatment, the unsintered multilayer structure is semisintered to give a semisintered multilayer structure in which each layer has a distinct endothermic peak in a temperature range of from 332° to 348° C. on a crystalline melting curve as measured with a differential scanning calorimeter (hereinafter referred to as "DSC") and also has a crystalline conversion of from 0.1 to 0.85.

The heating of the unsintered multilayer structure in this step for obtaining the semisintered multilayer structure is generally performed at a temperature not lower than the melting point of sintered PTFE, preferably at a temperature not lower than the melting point of sintered PTFE and not higher than the highest of the melting points of the powders used to obtain the unsintered multilayer structure. It is also possible to obtain a semisintered multilayer structure by heating the unsintered multilayer structure at a temperature higher than the melting point of unsintered PTFE for a very short period of time, but in this case also, the layers constituting the thus-heated multilayer structure should have crystalline conversions in the range specified above. However, if heating of the unsintered multilayer structure is conducted at a temperature lower than the melting point of sintered PTFE, a semisintered multilayer structure cannot be obtained, no matter how long the heating is continued.

The heating time required in this heat treatment step varies depending on the heating temperature, the thickness of the unsintered multilayer structure to be heated, and other factors and, hence, it is difficult to determine the heating time unconditionally. Generally, the higher the heating temperature, the shorter the heating time, and the thicker the membrane to be heated, the longer the heating time. Upon practicing this step, the treating conditions can be determined experimentally so as to obtain a semisintered multilayer structure in which the crystalline conversions of the layers constituting the semisintered structure are within the range specified hereinabove.

Whether each layer of the unsintered multilayer structure has been semisintered in this step or not can be judged from endothermic peak due to melting and from crystalline conversion. That is, a semisintered layer shows a distinct endothermic peak in a temperature of from 332° to 348° C. on a crystalline melting curve as measured with a DSC and has a crystalline conversion, as defined from the heat of fusion of unsintered PTFE, semisintered PTFE, and sintered PTFE, of from 0.10 to 0.85.

The crystalline melting curve may be measured, for example, by means of a commercial DSC (e.g., "DSC-7" manufactured by Perkin-Elemer Co.) as follows.

First, an unsintered PTFE sample is placed on an aluminum pan of the DSC, and the heat of fusion of the unsintered PTFE and that of sintered PTFE are measured according to the following procedures.

(I) The sample of unsintered PTFE (PTFE fine powder used to form one of the layers of the multilayer structure) is heated at a heating rate of 50° C./min to 250° C., and then at a heating rate of 10° C./min from 250° C. to 380° C..

Figure 3:
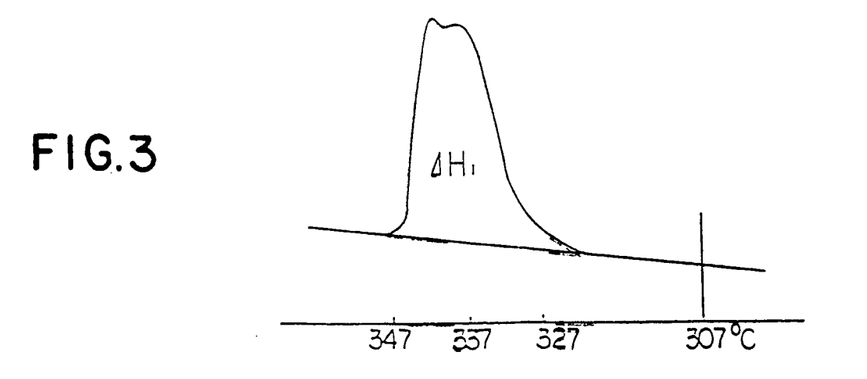
FIGS. 3, 4 and 5 show examples of crystalline melting curves as measured with a differential scanning calorimeter for unsintered PTFE, sintered PTFE, and semisintered PTFE, respectively.

An example of crystalline melting curves recorded during this heating step is shown in FIG. 3. The position of the endothermic peak due to melting on the crystalline melting curve obtained in this step is defined as the melting point of the unsintered PTFE or the melting point of the PTFE fine powder.

(II) Immediately after heating to 380° C., the sample is cooled at a cooling rate of 10° C./min to 250° C..
(III) The sample is then heated again at a heating rate of 10° C./min to 380° C.

Figure 4:
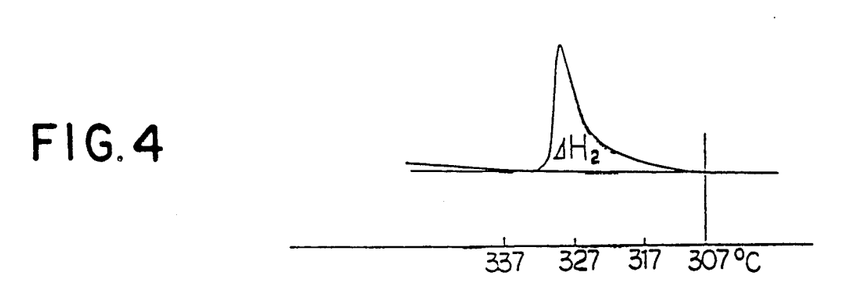

An example of crystalline melting curves recorded during this step (III) is shown in FIG. 4. The position of the endothermic peak due to melting on the crystalline melting curve obtained in this step (III) is defined as the melting point of the sintered PTFE.

The heat of fusion of the unsintered or sintered PTFE is proportional to the area between the endothermic curve and the base line. In this calorimetric analysis using "DSC-7" manufactured by Perkin-Elemer, the heat of fusion is automatically calculated if analyzing temperature is fixed.

Figure 5:
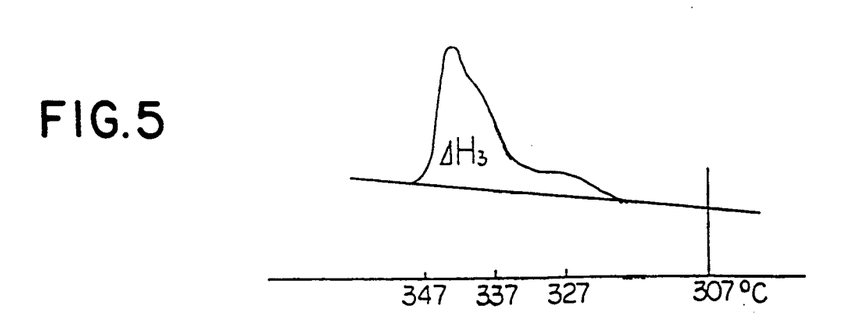

Subsequently, part of that layer of the semisintered PTFE multilayer structure obtained by the heat treatment step according to the process of the present invention which has been made from the PTFE fine powder analyzed above is cut off as a sample, and a crystalline melting curve for this sample is measured according to the same manner as in step (I) above. An example of such curves is shown in FIG. 5. The PTFE layers that have been semisintered in this heat treatment step each has a distinct endothermic peak within a temperature range of from 332° to 348° C. on the crystalline melting curve therefor.

The crystalline conversion is calculated using the following equation:

Crystalline conversion = $(\Delta H_1 - \Delta H_3)/(\Delta H_1 - \Delta H_2)$

In the above equation, $\Delta H_1$ is the heat of fusion of the unsintered PTFE (see FIG. 3), $\Delta H_2$ is the heat of fusion of the sintered PTFE (see FIG. 4), and $\Delta H_3$ is the heat of fusion of the semisintered PTFE (see FIG. 5). It can therefore be understood that if the crystalline conversions of the layers of the multilayer structure after the heat treatment step are 0, the multilayer structure is still in an unsintered state, while if the crystalline conversions thereof are 1, the multilayer structure has been sintered completely.

The crystalline conversion of each of the layers constituting the semisintered PTFE multilayer structure that has been heat-treated in this step according to the present invention is generally from 0.10 to 0.85, preferably from 0.15 to 0.75.

The thus-obtained semisintered PTFE multilayer structure may be of any ordinary shape such as, for example, films, sheets, tubes, rods, etc.

The semisintered PTFE multilayer structure according to the present invention is per se useful, besides being used as an intermediate material for the production of the multilayer PTFE porous membrane according to the present invention. For example, a semisintered PTFE multilayer structure in the form of tape can be used as an insulting material for flat cables. In general, a PTFE-based flat cable is obtained by sandwiching cable wires between two tapes of unsintered PTFE, pressing this assemblage by means of rolls, and then sintering the resulting assemblage to fusion-bond the two unsintered tapes to each other. This conventional process, however, has been disadvantageous in that since unsintered PTFE tapes undergo considerable dimensional changes during sintering, the production process should be controlled so as to cope with such dimensional changes, and that the adhesion between the PTFE tapes is poor. These drawbacks can be eliminated by use of the semisintered multilayer tape according to the present invention, because it shows good fusion-bondability when it contains, on one side thereof, a layer made of PTFE containing a perfluorovinyl ether, and because it undergoes only a slight dimensional change and, hence, the control of the flat cable-production process can be made simple.

(4) Stretching Step

The multilayer unsintered film obtained through the above-described paste-extrusion step (1) and rolling step (2) if any is stretched at least monoaxially.

The stretching is generally carried out between rolls revolving at different speeds or by means of a tenter in an oven. The stretching temperature is preferably not higher than the melting point of sintered PTFE. The stretching may be performed either monoaxially or biaxially, and the draw ratio may be determined according to use of the membrane being produced. For the industrial production, the stretching may generally be performed as follows.

(A) In the case of monoaxial stretching, the multilayer unsintered film is stretched in a direction parallel with or perpendicular to the extruding direction.

(B) In the case of biaxial stretching, the multilayer unsintered film is first stretched in the same manner as (A) above, and subsequently further stretched in a direction perpendicular to the first stretching.

Through the stretching, each layer in the multilayer unsintered film comes to be of a porous structure in which micropores are present uniformly throughout the layer. Thus, a multilayer PTFE porous membrane in which each layer has micropores is finally obtained.

If required and necessary, the multilayer porous membrane thus obtained may be heated at a temperature not lower than the melting point of sintered PTFE, or at a temperature not lower than the stretching temperature. Due to this heating, the multilayer porous membrane is made to undergo no dimensional change and to have an enhanced mechanical strength.

The average pore diameters of the layers in the multilayer porous membrane are determined by the kind of the PTFE fine powders 1, 2, 3, etc. used to constitute respective layers and by incorporation of other ingredient(s) thereinto. Illustratively stated, in order that a multilayer porous membrane comprising two or more layers having different average pore diameters be obtained according to the present invention, it is important that the two or more layers should be made respectively from at least two kinds of PTFE fine powders 1, 2, 3 etc.

One factor that can make one of the PTFE fine powders 1, 2, 3, etc. different from one or more of the other fine powders is a difference in endothermic peak on a crystalline melting curve as measured with a DSC.

Figure 6:
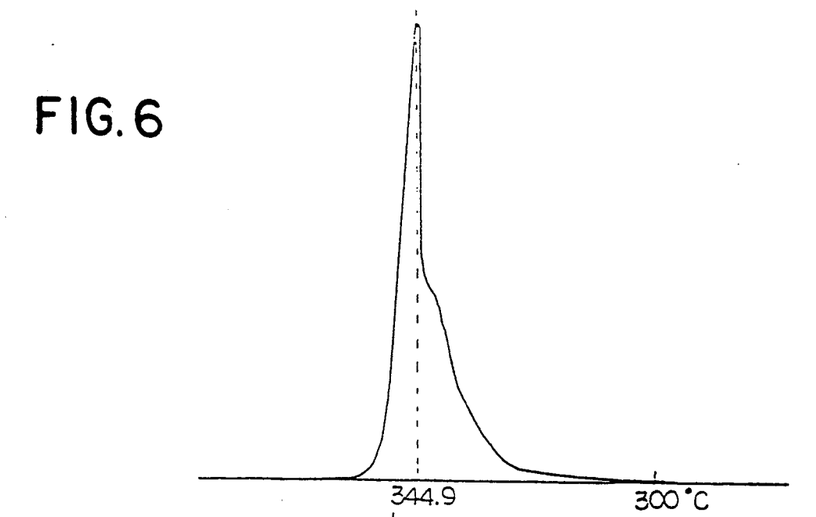
FIGS. 6, 7 and 8 respectively show crystalline melting curves as measured with a differential scanning calorimeter for unsintered, semisintered, and sintered PTFE fine powder 1 used in Example 1.
Figure 9:
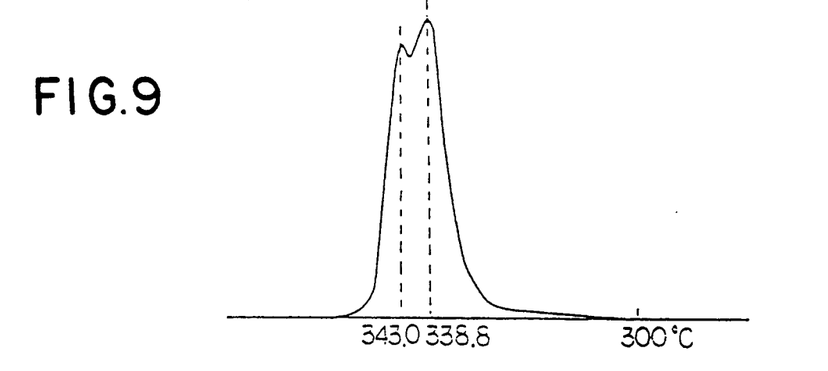
FIGS. 9, 10 and 11 respectively show crystalline melting curves as measured with a differential scanning calorimeter for unsintered, semisintered, and sintered PTFE fine powder 2 used in Example 1.
Figure 12:
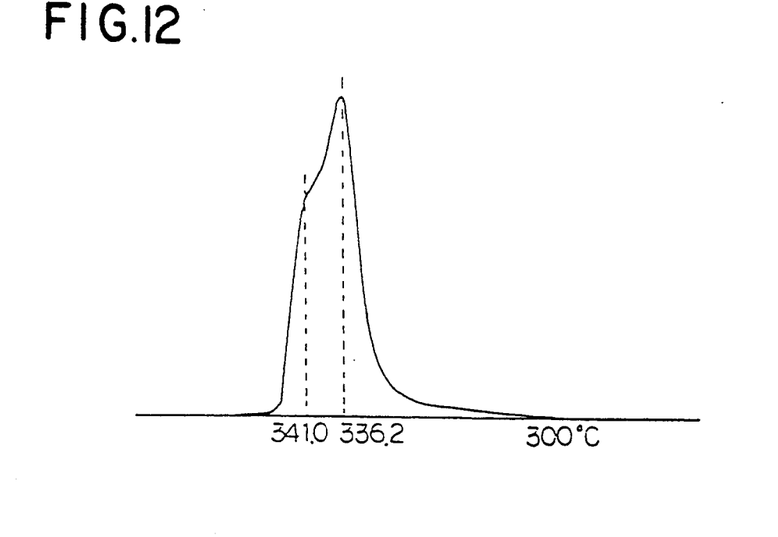
FIG. 12 shows a crystalline melting curve as measured with a differential scanning calorimeter for unsintered PTFE fine powder 3 used in Example 4.

It is difficult to unconditionally classify crystalline melting curves measured with a DSC for PTFE fine powders because the curves may be of various kinds according to production conditions for the powders. Normally, however, the curves are classified into the following two types. One is Type I which has a sharp high-temperature-side endothermic peak in a temperature range of from 341° to 348° C. and has no other distinct peak than that temperature (an example of which is shown in FIG. 6). The other is Type II which has a high-temperature-side endothermic peak in a temperature range of from 337° to 348° C. and a low-temperature-side endothermic peak in a temperature range of from 333° to 342° C. (an example of which is shown in FIG. 9). It should, however, be noted that in such Type II curves, one of the two endothermic peaks is, in some cases, observed not as a distinct peak but as a shoulder (an example of which is shown in FIG. 12).

In general, heat treatment of an unsintered multilayer structure comprising a combination of a PTFE fine powder having a Type I crystalline melting curve and a PTFE fine powder having a Type II crystalline melting curve at a temperature not lower than the melting point of sintered PTFE gives a semisintered multilayer structure in which the layer composed of the Type I PTFE fine powder has a lower crystalline conversion and the layer composed of the Type II PTFE fine powder has a higher crystalline conversion. If this semisintered multilayer structure is stretched at least monoaxially, a multilayer porous membrane in which the layer with a lower crystalline conversion, i.e., the Type I PTFE layer, has a larger average pore diameter and the layer with a higher crystalline conversion, i.e., the Type II PTFE layer, has a smaller average pore diameter.

Therefore, PTFE fine powders to be used for forming the PTFE layers constituting a semisintered multilayer structure may be selected in such a manner that the layer of the semisintered multilayer structure have different crystalline conversions. Besides combinations of Type I PTFE fine powders with Type II PTFE fine powders, such as that described above, a combination of Type I fine powders and a combination of Type II fine powders, for example, are also practically possible.

It is preferred that in the case where PTFE fine powders are combined so as to give a semisintered multilayer structure in which the PTFE layers have different crystalline conversions, the difference between the maximum of the crystalline conversions of the PTFE layers of the resulting semisintered multilayer structure and the minimum thereof be 0.1 or more. The crystalline conversion difference is more preferably from 0.1 to 0.65, and particularly preferably from 0.2 to 0.65. The larger the crystalline conversion difference, the more preferred.

Another factor that can make one of the PTFE fine powders 1, 2, 3, etc. different from one or more of the other fine powders is the presence of a non-fiber-forming material, i.e., the case in which at least one of the PTFE fine powders 1, 2, 3, etc. contains a non-fiber-forming material.

In general, PTFE fine powder particles have the property of readily forming fibers during the paste-extrusion step, rolling step, stretching step, etc., where shear stress is exerted on the powder particles being treated. On the other hand, particles of a low molecular weight PTFE polymer and particles of a polymer such as PFA (tetrafluoroethyleneperfluoroalkyl vinyl ether copolymer), FEP (tetrafluoroethylene-hexafluoropropylene copolymer), or the like do never form fibers in the above processing steps. For this reason, a layer of fine powder containing a non-fiber-forming material, such as the polymer particles mentioned above, forms a smaller number of fibers through the above-described steps and, as a result, gives a stretched layer having a larger average pore diameter, while a stretched layer made from PTFE fine powder only has a smaller average pore diameter. The non-fiber-forming polymer particles do not readily fall off the layer since they have been incorporated in interlocked fibers formed from the fine powder. However, in order to completely prevent the non-fiber-forming polymer particles from falling off the final porous membrane, it is effective to heat the membrane at a temperature not lower than the melting point of the polymer particles thereby to fusion-bond the polymer particles to the fibers.

The amount of the non-fiber-forming polymer particles mixed with a fine powder is generally from 5 to 120 parts by weight, preferably from 20 to 100 parts by weight, per 100 parts by weight of the PTFE fine powder. If the incorporated amount thereof is less than 5 parts by weight, no effect is produced by the incorporation thereof. If the amount thereof is larger than 120 parts by weight, there is a problem that the resulting multilayer porous membrane has impaired strength.

The non-fiber-forming material is not limited to fluoroplastics such as those described above. Other materials that can be used as the non-fiber-forming material to produce the above-described effect include inorganic materials such as carbon, graphite, titanium oxide, iron oxide, silica, glass fibers, and other inorganic particles such as glass beads, and organic materials such as particles of organic polymers including a polyimide, polyamideimide, polyphenylene sulfide, aromatic polyester, polyetheretherketone, and the like.

The particle diameter of the non-fiber-forming material is generally from 0.03 to 20 μm, and preferably from 1.0 to 10 μm. If it is smaller than 0.03 μm, the effect of the addition thereof tends to be insufficient, and if it is larger than 20 μm, the molding property of the PTFE fine powder tends to be deteriorated.

The particle diameter of the PTFE fine powder used in the present invention is not particularly limited, and is preferably from 200 to 1,000 μm, and more preferably from 450 to 600 μm.

As described hereinabove, the process of the present invention can provide a multilayer PTFE porous membrane in which all the layers have been united tightly and which comprises at least two layers having different average pore diameters, only by the ordinary steps of PTFE paste extrusion, rolling if any, and stretching. This process is characterized in that at least two kinds of PTFE fine powders 1, 2, 3, etc. are used to form the respective layers in the multilayer porous membrane, and that the process does not necessitate the troublesome step of superposing films on each other.

According to the process of the present invention, the filter layer, which has the smallest average pore diameter and determines permeability to gases and liquids, can be made to have a very thin thickness. Therefore, the multilayer PTFE porous membrane obtained by the process of the present invention is useful as a high-permeability filter medium for precision filtration and, further, there is no fear of interlaminar peeling during use since all the layers have been completely united.

In the case where the multilayer PTFE porous membrane produced by the process of the present invention is a flat membrane, it is useful as a filter medium for the precision filtration of liquids and gases, a battery separator, a permeable membrane for electrolysis, an electrical insulating material, or the like. In the case where the multilayer porous membrane is a tubular membrane, it is useful as a hollow fiber filter medium for liquids and gases, a material for producing artificial organs, such as artificial blood vessels and artificial lungs, endoscope tubes, etc.

The present invention will be explained in more detail by reference to the following Examples and Comparative Example, but the Examples should not be construed to be limiting the scope of the present invention.

In the examples, various properties were measured by the following methods.

(1) Membrane Thickness

The membrane thickness was measured with a membrane thickness meter (model "1D-110MH", manufactured by Mitsutoyo Co., Ltd., Japan).

(2) Porosity

The pores in the membrane to be evaluated are filled with pure water by the ethanol displacement method and the weight W (g) of this water-impregnated membrane was measured. Further, the absolute dry weight $W_0$ (g) and volume V (cm$^3$) of the membrane were measured. From these measured values, the porosity was calculated using the following equation.

$$\text{Porosity} = (W - W_0) \times 100 / V \, (\%)$$

(3) Gas Permeability

The porous membrane to be evaluated was cut into a disk having a diameter of 25 mm, and this disk was fixed to a filter holder having an effective permeation area of 2.15 cm$^2$. One side of the resulting filter was exposed to a pressurized nitrogen gas of 0.639 bar and the amount of the nitrogen gas passing through the membrane was measured with a mass flow meter.

From the thus-measured value, permeation rate (unit; l/cm$^2$.hr) was calculated which was the amount of the gas that passed through the membrane per square centimeter (cm$^2$) of the effective permeation area per hour.

(4) Average Pore Diameter

The mean flow pore diameter (MFP) measured by "Coulter Porometer" (manufactured by Coulter Electronics Co., U.S.A.) was regarded as the average pore diameter. From the following model experiment, it was ascertained that the thus-measured average pore diameter of the multilayer porous membrane of the present invention was substantially in agreement with the average pore diameter of the layer in the multilayer porous membrane that had the smallest average pore diameter.

Model Experiment

Two kinds of single-layer PTFE porous membranes were prepared which were porous membrane A having an average pore diameter as measured by "Coulter Porometer" of 0.20 μm and a thickness of 47 μm and porous membrane B having an average pore diameter as measured by "Coulter Porometer" of 0.98 μm and a thickness of 69 μm. Then, porous membrane A was just superposed on porous membrane B to give a two-layer porous membrane. On the other hand, one porous membrane A, as an intermediate layer, was sandwiched between two porous membranes B to give a three-layer porous membrane. The thus-obtained two multilayer porous membranes were examined for average pore diameter with "Coulter Porometer". As a result, the average pore diameter of the former membrane was 0.19 μm and that of the latter was 0.18 μm, these average pore diameter values being substantially in agreement with the average pore diameter of porous membrane A.

In the following Examples and Comparative Example, three kinds of PTFE fine powders specified below were used.

| PTFE fine powder | Endothermic peak on crystalline melting curve of unsintered PTFE | Non-fiber-forming material |
|---|---|---|
| 1 | Endothermic peak of FIG. 6 (Type I) | — |
| 2 | Endothermic peak of FIG. 9 (Type II) | — |
| 3 | Endothermic peak of FIG. 12 (Type II) | — |
| 4 | Endothermic peak of FIG. 6 (Type I) | Polymer particles of low molecular weight PTFE |

The above PTFE fine powders 1 to 4 each has an average primary particle diameter of from about 0.2 to 0.4 μm and has been obtained by the coagulation of an aqueous dispersion of emulsion-polymerized PTFE.

PTFE fine powders 1 to 3 were commercially available products and PTFE fine powder 4 was prepared in the following manner.

Preparation Method for PTFE Fine Powder 4

100 Parts by weight, on a dry basis, of an aqueous dispersion of emulsion-polymerized PTFE having an endothermic peak shown in FIG. 6 and an average primary particle diameter of from about 0.2 to 0.4 μm was mixed with 100 parts by weight, on a dry basis, of an aqueous dispersion of low molecular weight PTFE polymer particles (trade name "Lublon L-5", particle diameter: 0.1 to 0.4 μm, average molecular weight: 300,000 to 600,000, manufactured by Daikin Industries, Ltd., Japan) as a non-fiber-forming material. This mixture was stirred in a stirring vessel, upon which the two kinds of primary particles were mixed uniformly and coagulate to form secondary particles of about 200 to 1,000 μm. The resulting secondary particles were dried at 150° C. to remove the water, thereby obtaining PTFE fine powder 4.

EXAMPLE 1

100 Parts by weight of each of PTFE fine powder 1 (having a melting endothermic peak shown in FIG. 6) and PTFE fine powder 2 (having a melting endothermic peak shown in FIG. 9) was mixed with 23 parts by weight of a liquid lubricant (trade name "Isopar M", manufactured by Exxon Co.). In a manner similar to that illustrated in FIG. 1, the resulting two kinds of wetted powders were used to prepare a multilayer preform in which the ratio of the thickness of one layer to that of the other was 1/1. Subsequently, this multilayer preform was put in the cylinder 12 of a paste-extruding mold as shown in FIG. 2, and then extruded by means of a ram 14 to obtain a sheet. The sheet thus obtained was cut into about 100 mm length, and rolled in a direction perpendicular to the extruding direction. The rolled sheet was then heat-dried in an oven at 250° C. for 20 seconds to remove the liquid lubricant, thereby obtaining a multilayer unsintered film having a thickness of 100 μm.

Separately, the same multilayer unsintered film as that obtained above was prepared in the same manner as above except that one of the two powders used had been colored beforehand with a pigment. A section of this multilayer film, which section was cutting across the thickness of the film, was examined with a stereomicroscope. As a result, it was ascertained that the ratio of the thickness of one layer to that of the other was 1/1 as similar to the case of the multilayer preform.

The unsintered multilayer structure obtained above was heat-treated in an oven at 338° C. for 320 seconds, thereby obtaining a semisintered multilayer structure.

Figure 7:
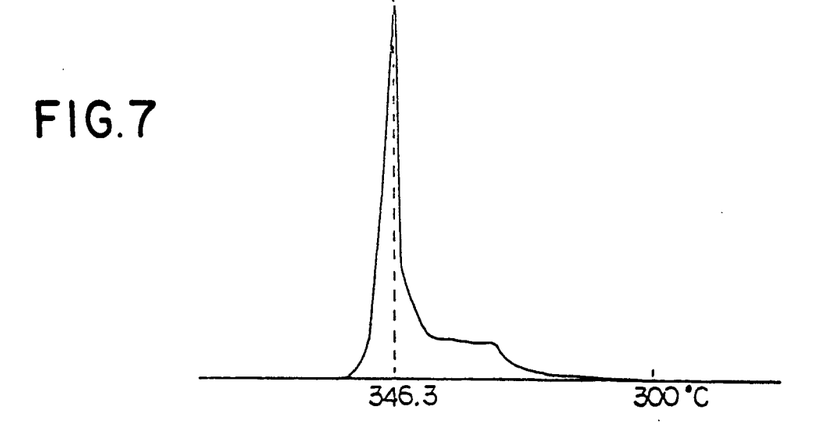
Figure 10:
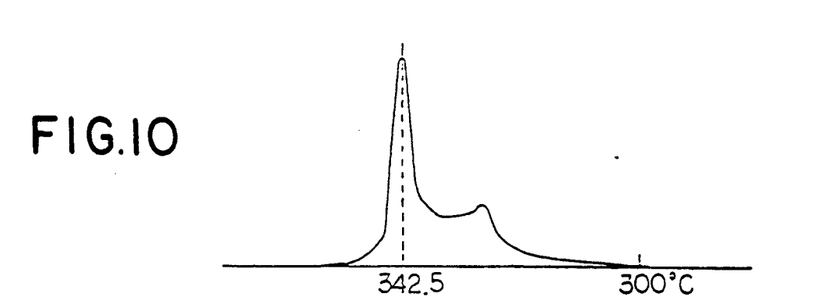

The surface of that layer of the thus-obtained semisintered multilayer structure which was made from fine powder 1 was scraped, and a sample collected therefrom was subjected to calorimetric analysis to determine the endothermic peak on a crystalline melting curve measured with a DSC. The results obtained are shown in FIG. 7. The melting endothermic peak of the layer made from fine powder 2 was determined in the same manner as above, and the results obtained are shown in FIG. 10.

Figure 8:
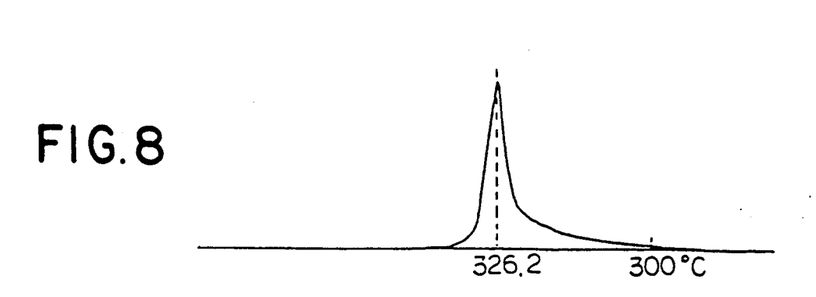
Figure 11:
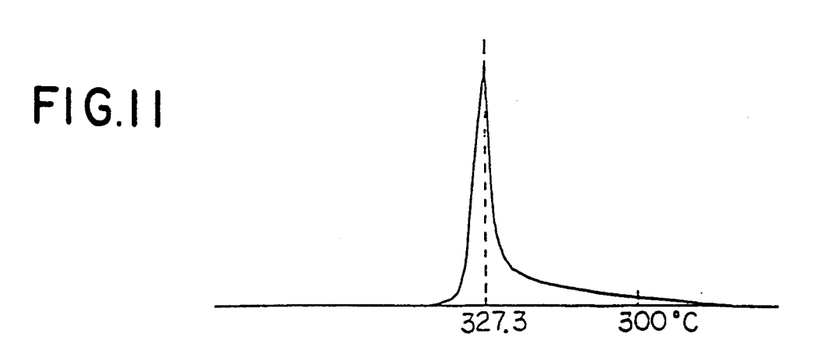

A crystalline melting curve for sintered fine powder 1 was measured with a DSC to determine the endothermic peak on the curve, and the results obtained are shown in FIG. 8. The endothermic peak of sintered fine powder 2 was measured in the same manner as above, and the results obtained are shown in FIG. 11.

From FIGS. 6, 7 and 8, the layer of the aboveobtained semisintered multilayer structure that was made from fine powder 1 was found to have a crystalline conversion of 0.58. From FIGS. 9, 10 and 11, the layer of the semisintered multilayer structure that was made from fine powder 2 was found to have a crystalline conversion of 0.75.

In an oven kept at about 300° C., the semisintered multilayer structure obtained above was stretched in a direction the same as the rolling direction at a stretching rate of 400%/sec in a draw ratio of 3, and further stretched in a direction perpendicular to the rolling direction in a draw ratio of 5, thereby obtaining a multilayer porous membrane having a thickness of 45 μm.

Figure 13:
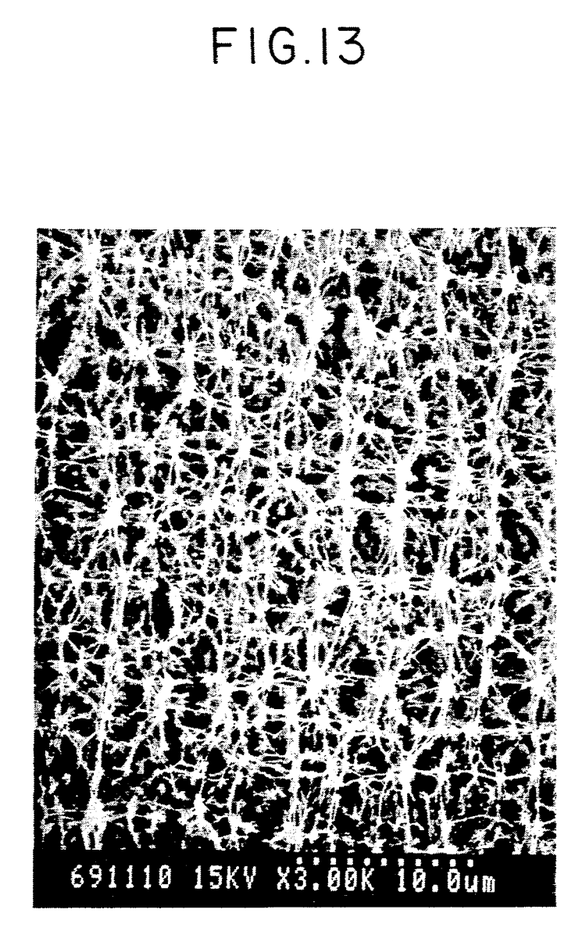
FIG. 13 is a scanning electron photomicrograph (magnification: 3,000) of the surface of that layer in the multilayer porous membrane of Example 1 which has been formed from PTFE fine powder 1.
Figure 14:
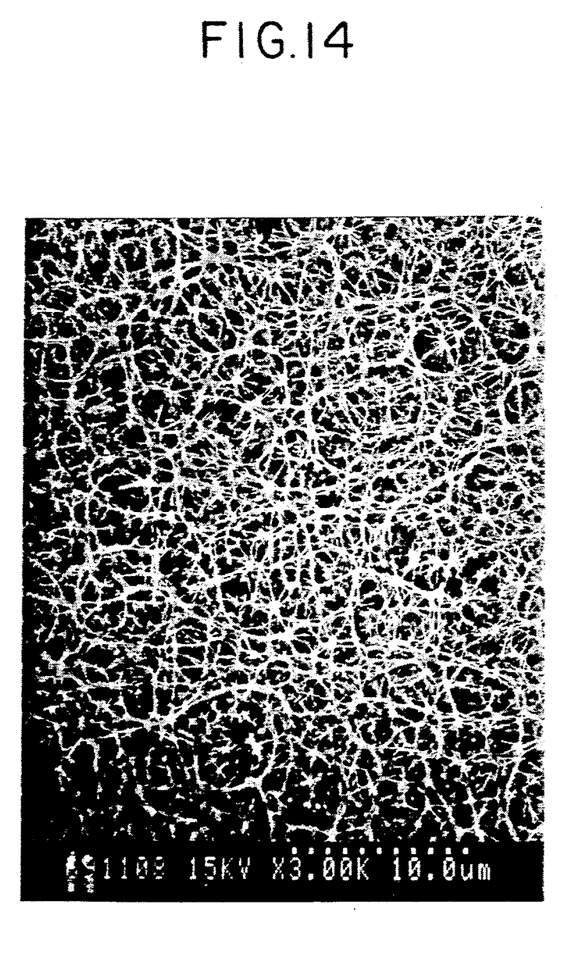
FIG. 14 is a scanning electron photomicrograph (magnification: 3,000) of the surface of that layer in the multilayer porous membrane of Example 1 which has been formed from PTFE fine powder 2.

A scanning electron photomicrograph (magnification: 3,000; hereinafter referred to as "SEM photograph") of the surface of that layer of the multilayer porous membrane which was made from fine powder 1 is shown in FIG. 13, while an SEM photograph of the surface of the layer made from fine powder is shown in FIG. 14. From the two photographs, it can be seen that in the multilayer porous membrane obtained, the layer made from fine powder 1 had a larger average pore diameter and the layer made from fine powder 2 had a smaller average pore diameter.

This multilayer porous membrane had a porosity of 83%, an average pore diameter of 0.24 μm, and a gas permeation rate of 280 l/cm$^2$.hr.

EXAMPLE 2

Using the same PTFE fine powders 1 and 2 as those used in Example 1, extrusion, rolling, and heat-treatment were conducted in the same manner as in Example 1 except that the ratio of the thickness of the layer of fine powder 1 to that of the layer of fine powder 2 was 4/1. Thus, a semisintered multilayer structure having a thickness of 100 μm was obtained. In an oven kept at about 300° C., the semisintered multilayer structure obtained above was stretched in a direction the same as the rolling direction at a stretching rate of 100%/sec in a draw ratio of 6, thereby obtaining a multilayer porous membrane having a thickness of 59 μm.

As similar to Example 1, a comparison between SEM photographs of the surfaces of the two layers of the thus-obtained multilayer porous membrane showed that the layer made from fine powder 1 had a larger average pore diameter and the layer made from fine powder 2 had a smaller average pore diameter. This multilayer porous membrane had a porosity of 63%, an average pore diameter of 0.08 μm, and a gas permeation rate of 13.5 l/cm$^2$.hr.

EXAMPLE 3

A multilayer porous membrane having a thickness of 43 μm was obtained in the same manner as in Example 2 except that in an oven kept at about 300° C., the semisintered multilayer structure was stretched in a direction the same as the rolling direction at a stretching rate of 400%/sec in a draw ratio of 3 and further stretched in a direction perpendicular to the rolling direction in a draw ratio of 5.

A comparison between SEM photographs of the surfaces of the two layers of the thus-obtained multilayer porous membrane showed that the layer made from fine powder 1 had a larger average pore diameter and the layer made from fine powder 2 had a smaller average pore diameter. This multilayer porous membrane had a porosity of 82%, an average diameter of 0.25 μm, and a gas permeation rate of 345 l/cm² hr.

EXAMPLE 4

As an example of a combination of fine powders whose endothermic peaks on crystalline melting curves as measured with a DSC both belonged to Type II, a wetted powder obtained by mixing 100 parts by weight of fine powder 2 (having a melting endothermic peak as shown in FIG. 9) and 23 parts by weight of a liquid lubricant and a wetted powder obtained by mixing 100 parts by weight of fine powder 3 (having a melting endothermic peak as shown in FIG. 12; a copolymer with 0.01 wt% of a perfluorovinyl ether) and 22 parts by weight of a liquid lubricant were used. Extrusion and rolling were conducted in the same manner as in Example 2, thereby obtaining a 100 μm-thick unsintered multilayer structure in which the ratio of the thickness of the layer made from fine powder 2 to that of the layer made from fine powder 3 was 4/1.

This unsintered multilayer structure was heat-treated in an oven at 338° C. for 150 seconds to obtain a semisintered multilayer structure. The crystalline conversion of the layer of the thus-obtained semisintered multilayer structure that was made from fine powder 2 and that of the layer made from fine powder 3 were measured in the same manner as in Example 1, and was fount that the crystalline conversions were 0.55 and 0.73, respectively. This semisintered multilayer structure was biaxially stretched in the same manner as in Example 1, thereby obtaining a multilayer porous membrane having a thickness of 42 μm.

A comparison between SEM photographs of the surfaces of the two layers of the thus-obtained multilayer porous membrane showed that the layer made from fine powder 2 had a larger average pore diameter and the layer made from fine powder 3 had a smaller average pore diameter. This multilayer porous membrane had a porosity of 80%, an average pore diameter of 0.19 μm, and a gas permeation rate of 129 l/cm² hr.

EXAMPLE 5

Using PTFE fine powder 4, which was a mixture of 100 parts by weight of the same PTFE fine powder 1 as that used in Example 1 and 100 parts by weight of low molecular weight PTFE polymer particles, and also using the same PTFE fine powder 2 as that used in Example 1, extrusion, rolling, heat-treatment and stretching were conducted in the same manner as in Example 1 except that the ratio of the thickness of the layer of fine powder 4 to that of the layer of fine powder 2 was 4/1. Thus, a multilayer porous membrane having a thickness of 49 μm was obtained.

Figure 15:
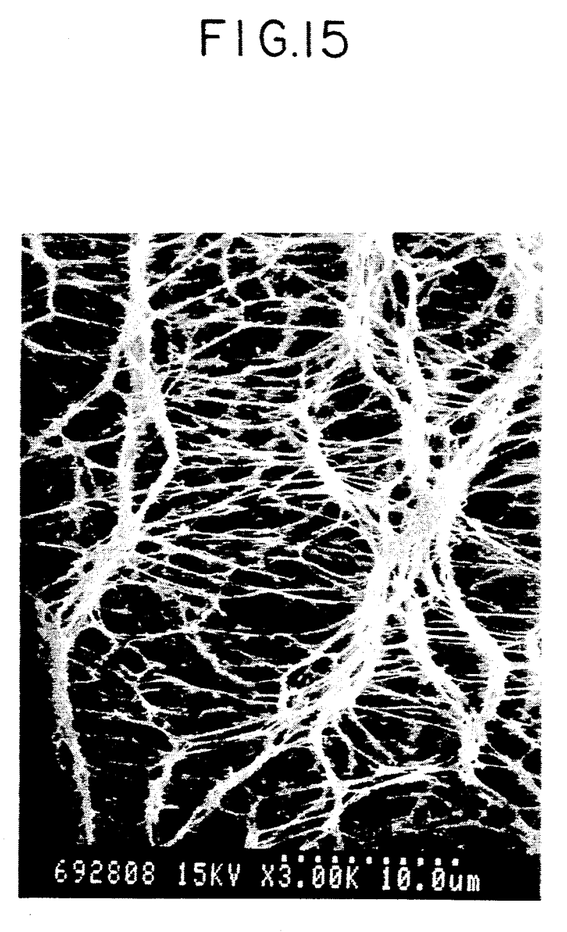
FIG. 15 is a scanning electron photomicrograph (magnification: 3,000) of the surface of that layer in the porous membrane of Example 5 which has been formed from PTFE fine powder 4.
Figure 16:
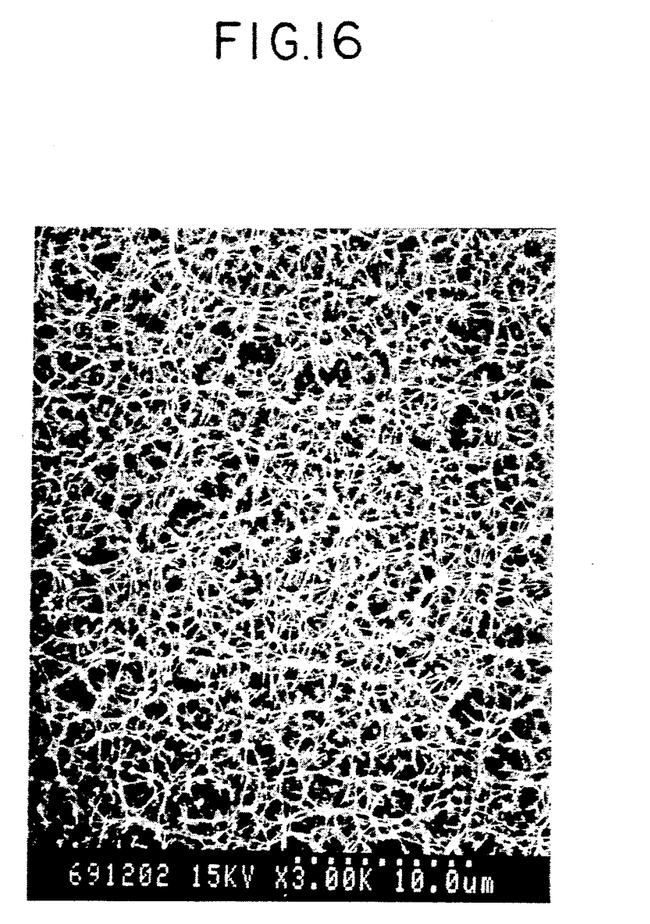
FIG. 16 is a scanning electron photomicrograph (magnification: 3,000) of the surface of that layer in the multilayer porous membrane of Example 5 which has been formed from PTFE fine powder 2.

An SEM photograph of the surface of that layer of the thus-obtained multilayer porous membrane which was made from fine powder 4 is shown in FIG. 15, while an SEM photograph of the surface of the layer made from fine powder 2 is shown in FIG. 16. From the two photographs, it can be seen that in the multilayer porous membrane obtained, the layer made from fine powder 4 has a larger average pore diameter and the layer made from fine powder 2 has a smaller average pore diameter.

This multilayer porous membrane had a porosity of 84%, an average pore diameter of 0.25 μm, and a gas permeation rate of 523 l/cm².hr.

EXAMPLE 6

Using the same PTFE fine powder 4 as that used in Example 5 and the same PTFE fine powder 2 as that used in Example 1, a multilayer preform was prepared which had a three-layer structure consisting of one fine powder 2 layer sandwiched between two fine powder 4 layers, with the ratio of the thickness of one of the fine powder 4 layers to that of the fine powder 2 layer to that of the other fine powder 4 layer being 2/1/2. This preform was extruded, rolled, heat-treated, and stretched in the same manner as in Example 1, thereby obtaining a multilayer porous membrane having a thickness of 48 μm.

This multilayer porous membrane had a porosity of 83%, an average pore diameter of 0.24 μm, and a gas permeation rate of 435 l/cm².hr.

The thickness of the intermediate layer of the above-obtained multilayer porous membrane was measured and found to be about 9 μm. Separately, it was tried to prepare the same multilayer porous membranes as above by the conventional laminating method, but membrane fabrication was so difficult that none of the thus-obtained multilayer porous membranes had an intermediate layer having a uniform thickness of about 9 μm.

Further, the multilayer porous membranes obtained in Examples 1 to 6 were subjected to a physical breakage test in the following manner: On both sides of the porous membrane at the edge thereof, adhesive tapes were adhered while the adhesive tapes did not contact with each other. The adhesive tape were pulled to be peeled from the porous membrane, and it was observed whether or not interlaminar peeling occurred in the porous membrane. As a result, no interlaminar peeling was observed in all the porous membrane.

COMPARATIVE EXAMPLE 1

Using PTFE fine powder 2 only as raw fine powder, extrusion, rolling, heat-treatment, and stretching were conducted in the same manner as in Example 1 to obtain a porous membrane having a thickness of 35 μm.

This porous membrane had a porosity of 82%, an average pore diameter of 0.24 μm, and a gas permeation rate of 207 l/cm².hr.

COMPARATIVE EXAMPLE 2

Using PTFE fine powder 2 only as raw fine powder, extrusion, rolling, heat-treatment, and stretching were conducted in the same manner as in Example 2 to obtain a porous membrane having a thickness of 56 μm.

This porous membrane had a porosity of 62%, an average pore diameter of 0.08 μm, and a gas permeation rate of 5.6 l/cm².hr.

COMPARATIVE EXAMPLE 3

Using PTFE fine powder 3 only as raw fine powder, extrusion, rolling, heat-treatment, and stretching were conducted in the same manner as in Example 4 to obtain a porous membrane having a thickness of 40 μm.

This porous membrane had a porosity of 77%, an average pore diameter of 0.19 μm, and a gas permeation rate of 111 l/cm².hr.

Table 1 summarizes the results of the above Examples and Comparative Examples.

TABLE 1

|  | Membrane thickness (μm) | Porosity (%) | Average pore diameter (μm) | Gas permeation rate (l/cm$^2$·hr) |
| --- | --- | --- | --- | --- |
| Example 1 | 45 | 83 | 0.24 | 280 |
| Example 2 | 59 | 63 | 0.08 | 13.5 |
| Example 3 | 43 | 82 | 0.25 | 345 |
| Example 4 | 42 | 80 | 0.19 | 129 |
| Example 5 | 49 | 84 | 0.25 | 523 |
| Example 6 | 48 | 83 | 0.24 | 435 |
| Comparative Example 1 | 35 | 82 | 0.24 | 207 |
| Comparative Example 2 | 56 | 62 | 0.08 | 5.6 |
| Comparative Example 3 | 40 | 77 | 0.19 | 111 |

While the invention has been described in detail and with reference to specific embodiments thereof, it will be apparent to one skilled in the art that various changes and modifications can be made therein without departing from the spirit and scope thereof.

What is claimed is:

1. A process for producing a multilayer polytetrafluoroethylene porous membrane comprising at least two layers having different average pore diameters, said process comprising the steps of: filling the inside of a cylinder of an extruding mold distinctively with at least two kinds of polytetrafluoroethylene fine powders with each of which a liquid lubricant has been mixed; paste-extruding said powders to obtain a multilayer extrudate, which is then optionally rolled; removing said liquid lubricant from said multilayer extrudate or said rolled multilayer extrudate to obtain an unsintered multilayer structure; subsequently heating said unsintered multilayer structure at a temperature not lower than the melting point of sintered polytetrafluorothylene to obtain a semisintered multilayer structure; and then stretching said semisintered multilayer structure at least monoaxially.

2. A process as claimed in claim 1, wherein at least one of said polytetrafluoroethylene fine powders differs from the other powders in endothermic peak on a crystalline melting curve as measured with a differential scanning calorimeter.

3. A process as claimed in claim 1, wherein in said semisintered multilayer structure made from said polytetrafluoroethylene fine powders, the layers constituting said semisintered multilayer structure have respective crystalline conversions, with the difference between the maximum value thereof and the minimum value thereof being 0.1 or more.

4. A process as claimed in claim 1, wherein at least one of the polytetrafluoroethylene fine powders contains a non-fiber-forming material.

* * * * *